Oct. 30, 1962 M. F. KRUSE 3,061,117
WEIGHT GAUGE FOR HYDRAULIC LOADER
Filed Dec. 11, 1958

MARVIN F. KRUSE
INVENTOR.

BY Hiram A. Sturges
Agent

United States Patent Office 3,061,117
Patented Oct. 30, 1962

3,061,117
WEIGHT GAUGE FOR HYDRAULIC LOADER
Marvin F. Kruse, Benson Station, Rte. 1, Omaha, Nebr.
Filed Dec. 11, 1958, Ser. No. 779,783
1 Claim. (Cl. 214—2)

This invention relates to fluid pressure actuated weighing devices, and in particular a fluid pressure indicating gauge connected to the discharge of a pump of a tractor whereby fluid under pressure required to elevate an object is applied to the gauge or other weighing device so that the weight of a load being elevated by a hydraulic jack or cylinder may be accurately determined, or indicated.

One of the purposes of this invention is to provide means for measuring feed fed to stock by a tractor having a scoop, such as a bucket-loader, in ice, snow, and other inclement weather where it is difficult to drive the scoop the same distance into the feed supply for each load.

In feeding stock in inclement weather, and particularly in ice and snow by a scoop carried by arms extended from a tractor the wheels spin or slide, making it difficult to drive the scoop into the supply with the same force, resulting in varied loads and inconsistent feeding.

In feeding stock, as an example, the feed is scooped from the ground or storage pits and deposited in wagons with a hydraulic lift, such as a manure loader, and from the wagon the feed is placed in hoppers or scattered on the ground. The feed is measured by guess or average number of scoops and when the load is light the healthy condition of the stock is impaired, and the animals do not gain weight.

It is a further object and it will be understood that this invention is applicable to the job of loading earth and rock. For example, in loading earth into trucks, the operator can be sure not only of the amount of earth moved but also that the truck is not being overloaded.

In moving rock wherein the load varies so because of the assorted sizes, the operator can accurately tabulate the combined loads easily, eliminating the need of weighing each truck load by scale.

With this thought in mind this invention contemplates a gauge connected to the fluid pressure line from a pump of a tractor to a hydraulic cylinder for elevating a scoop wherein upon applying the pressure required to elevate the scoop to the gauge the weight of feed in the scoop is readily indicated.

The object of this invention is, therefore, to provide means for connecting a fluid pressure actuated gauge to a tractor having a scoop thereon so that the weight of material in the scoop may be accurately indicated.

Another object of the invention is to provide a gauge for indicating the weight of material in a scoop of a tractor in which the gauge may readily be installed on tractors now in use.

Another important object of the invention is to provide a gauge for indicating the weight of material in a scoop of a tractor in which the gauge is designed to be installed by the average mechanic.

A further object of the invention is to provide a gauge for indicating the weight of material in the scoop of a tractor in which the device is used without interfering with the conventional use of the tractor.

A still further object of the invetnion is to provide a gauge assembly for indicating the weight of material in a scoop of the tractor in which the gauge assembly is of simple and economical construction.

Yet another object is to provide a gauge assembly for indicating the weight of material in a hydraulic lift or loader which is adapted to be applied to bucket loaders as well as other types of loader heads such as fork lifts, hoists, hay-bale lifters and the like.

With these and other objects and advantages in view, the invention embodies a gauge connected by a tube to the discharge of a pump of a tractor, and a valve in the tube whereby the fluid under pressure in the tube may be disconnected from hydraulic cylinders of the tractor and applied to the gauge so that the pressure required to elevate the scoop will show on the gauge.

The above objectives chiefly relate to indication means for indicating the position of bucket-carrying arms with respect to a point fixed with respect to the tractor or vehicle. The objectives set forth below all relate to a second and separate indicating device cooperative with the first indicating device and with a calibrated weight indicator, the second indicator being for the sole purpose of indicating when the bucket is at a certain position of tilt with respect to the bucket-carrying arms.

I am aware that a certain Patent No. 2,668,631, issued to H. R. Reese, titled Hydraulic Loader, issued February 1954, shows an indicator near the driver's seat of a loader which is adapted to indicate the position of tilt of a bucket with respect to bucket-carrying arms.

While I also propose an indicator for indicating the angle of tilt of the bucket with respect to the arms, my indicator can be much more simple and inexpensive because my purpose is only to define a definite point at which to consistently hold the bucket during each weighing in order that the leverage which material in the bucket applies against the arms is consistent and so that it does not change with the otherwise varying position of tilt, in which when the bucket is outwardly extended, for example, the center of gravity of the load in the bucket would exert a greater leverage and register an untruly great load weight.

A further objective of my invention and difference from the Reese indicator, is that the bucket tilt indicator of my invention is fixed to a bucket-carrying arm, while a marker is fixed to the bucket.

A further difference from the Reese patent is in my objective of providing a weight gauge as a central working element and with indicators only for supporting and making accurate the weighing.

Other features and advantages of the invention will appear from the following description taken in connection with the drawings, wherein.

Figure 1:
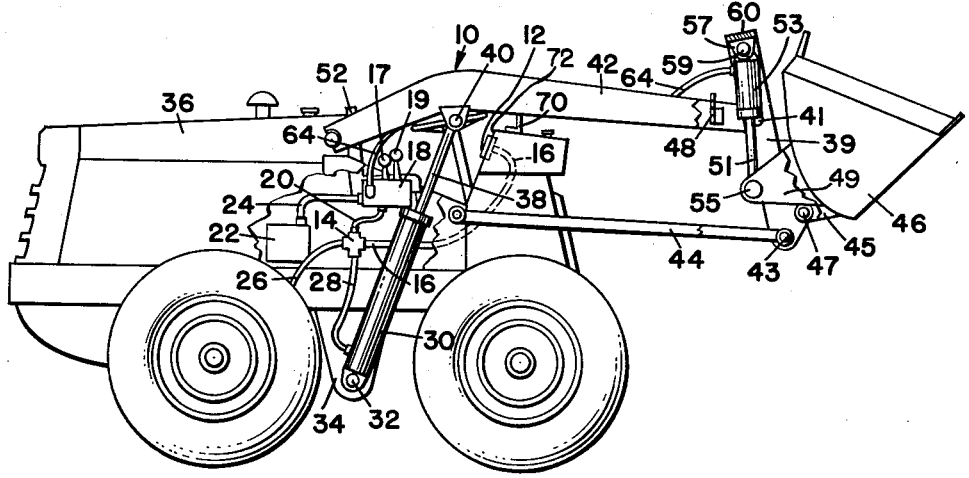
FIGURE 1 is a side elevational view of a tractor with parts broken away, illustrating the mounting of the load indicating gauge thereon.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a gauge, numeral 14 a fitting in the form of a cross and to which the gauge 12 is connected by a tube 16, numeral 18 a control valve having hand levers 17 and 19 connected to the fitting by a tube 20, numeral 22 a pump connected to the control valve by a tube 24, and numerals 26 and 28 tubes extended from the fitting 14 to lower ends of hydraulic cylinders 30.

The hydraulic cylinders 30 are pivotally mounted by pins 32 to hangers 34 of a tractor 36 and piston rods 38 extended from upper ends of the cylinders are pivotally connected by pins 40 to arms 42, which, in combination with the rods 44 suspend a scoop 46 from the tractor.

The forward ends of the arms 42 and rods 44 are each pivotally secured to a scoop supporting frame 39 of inverted U-shape by pins 41 and 43 respectively.

The back side of the scoop 46 has a pair of spaced, rearwardly extending ears 45, adjacent the bottom thereof, which are pivotally secured to the frame 39 by pins 47.

Another pair of ears 49 also extend rearwardly from the scoop and are pivotally connected to the outer end of piston rods 51 of inverted cylinders 53 by pins 55.

The butt end of the cylinders 53 are pivotally anchored between ears 57 by pins 59. The ears 57 are secured, in spaced positions, to the underside of the upper horizontal member 60 of the supporting frame 39. Tubing 62 and 64 connect the cylinders to the control valve 18.

As thus described, it will be seen that as illustrated the elevation of the lift arms 42 and position of the scoop 46 are individually controlled through manipulation of the control valve levers 17 and 19.

Figure 3:
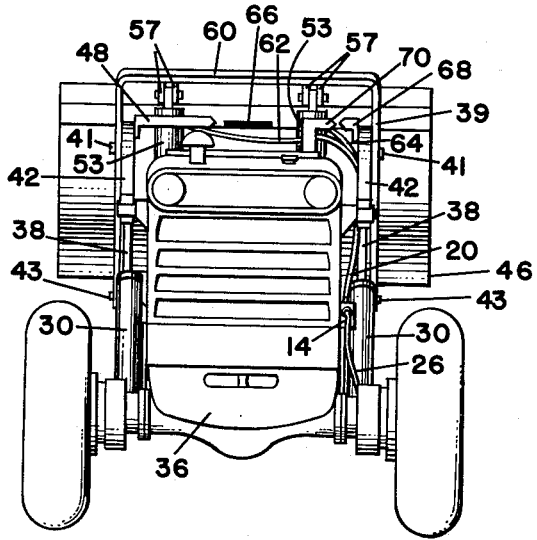
FIGURE 3 is a rear view of the tractor showing particularly, the mounting of the registering pointers of this invention.

Obviously, the weight of the feed or other load varies with the position of the scoop, and for this reason one of the arms 42 is provided with a pointer 48 positioned adjacent the forward end of the arm and disposed extended inwardly therefrom at substantially a right angle from the arm, as best seen in FIGURE 3.

A registry mark 66 or other means such as a plate is affixed or secured on the back side of the scoop 46 in a predetermined position.

A pointer 68 is mounted on the opposite one of the arms 42 and near the intermediate portion of the arm. The pointer 68 is positioned to register with a similar pointer 70 on the tractor.

When a load is taken up in the scoop 46, the operator manipulates the control valve levers 17 and 19 to adjust the mark 66 on the scoop so as to register with the pointer 48 and then elevates the arms 42 to align the pointer 68 with the pointer 70, whereby the scoop is in a suitable position for measuring the weight of products therein.

Figure 2:
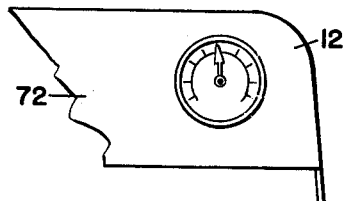
FIGURE 2 is a fragmentary view of the tractor instrument panel, on an enlarged scale, showing the gauge mounted therein.

The weight indicating gauge 12 may be placed in any desired position within view of the operator. However, it is desirable to mount the gauge on the instrument panel 72 of the tractor as shown in FIGURES 1 and 2.

It is further evident that the pointers can be made adjustable so as to be readily adaptable to different models and makes of hydraulic bucket loaders.

The weighing device may be connected to one or both of the cylinders of the tractor as may be desired, and it will be understood that an operator on the seat 52 of the tractor may operate the valve 18 by the hand levers 17 and 19 whereby fluid under pressure from the pump may pass directly to the cylinders, or so that the fluid is cut off from the cylinders and applied to the gauge. By this means and with the pointers 48, 68 and 70 in respective registering relation, the exact weight of material such as feed in the scoop may readily be determined, and with the weight indicated a constant amount of feed may be used daily regardless of weather conditions.

As thus described, the arrow indicators 68, 70 define an arm position or arm elevation indicating means. And the arrow indicator 48 and mark 66 define a scoop tilt or scoop-tilt-with-respect-to-the-arms indicating means.

The mark 66 is on an upper part of the back of the scoop 46 opposite arrow indicator 48 when the bucket is in an upright weighing position as seen in FIGURES 1 and 3.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore a more lengthy description is regarded as unnecessary.

Changes in shape, size and arrangement of details and parts such as come within the purview of the invention claimed may be resorted to in actual practice, if desired.

Having now described the invention that which is claimed to be new and desired to be procured by Letters Patent, is:

The combination which comprises: a tractor, arms having inner ends pivotally mounted, a scoop mounted on the extended ends of said arms, hydraulic cylinder means mounted on said tractor and operatively connected to said arms, a pump mounted on the tractor, a fitting mounted on the tractor, and a valve mounted on the tractor connected to the pump by tubes, fitting, cylinders and gauge, whereby the arms are actuated by fluid under pressure and the weight of material in the scoop is measured by the gauge, said gauge having weight indicia and being calibrated to indicate the weight of a load in said scoop at times when said arms are in a certain position, arm position indicating means visible from the operator's normal position on said tractor for indicating to the operator when said arms are in said certain positions whereby the weight indicated is substantially correct and not distorted by the variances in hydraulic pressure which exist in the cylinder means in the various positions of elevation of said arms because of the varying leverage effect of the load in the various positions, said visible arm-position indicating means comprising marking means on one of said arms and other marking means on said tractor such that when said marking means on one of said arms is aligned with said marking means on said tractor said certain position of said arms is indicated, so that all subsequent weighing can be done with said arms in said certain position to avoid weight distortion, means pivotally connecting said scoop to said arms such that the front end of said scoop can be tilted upwardly and downwardly about a horizontal axis, scoop position indicating means on said scoop and other scoop position indicating means on one of said arms cooperative with said position indicating means on said scoop for cooperatively indicating when said scoop is in a certain position with respect to said arm, and said gauge also being calibrated proportional to the effect of the weight of loads in said scoop at times when said scoop is in said certain position of tilt with respect to said arm.

References Cited in the file of this patent
UNITED STATES PATENTS

| | | |
|---|---|---|
| 2,668,631 | Reese | Feb. 9, 1954 |
| 2,726,778 | Hough et al. | Dec. 13, 1955 |
| 2,742,162 | Mandt | Apr. 17, 1956 |
| 2,851,171 | Martin et al. | Sept. 9, 1958 |